W. B. MURRAY.
TRAIN CONTROL SYSTEM.
APPLICATION FILED FEB. 10, 1913.

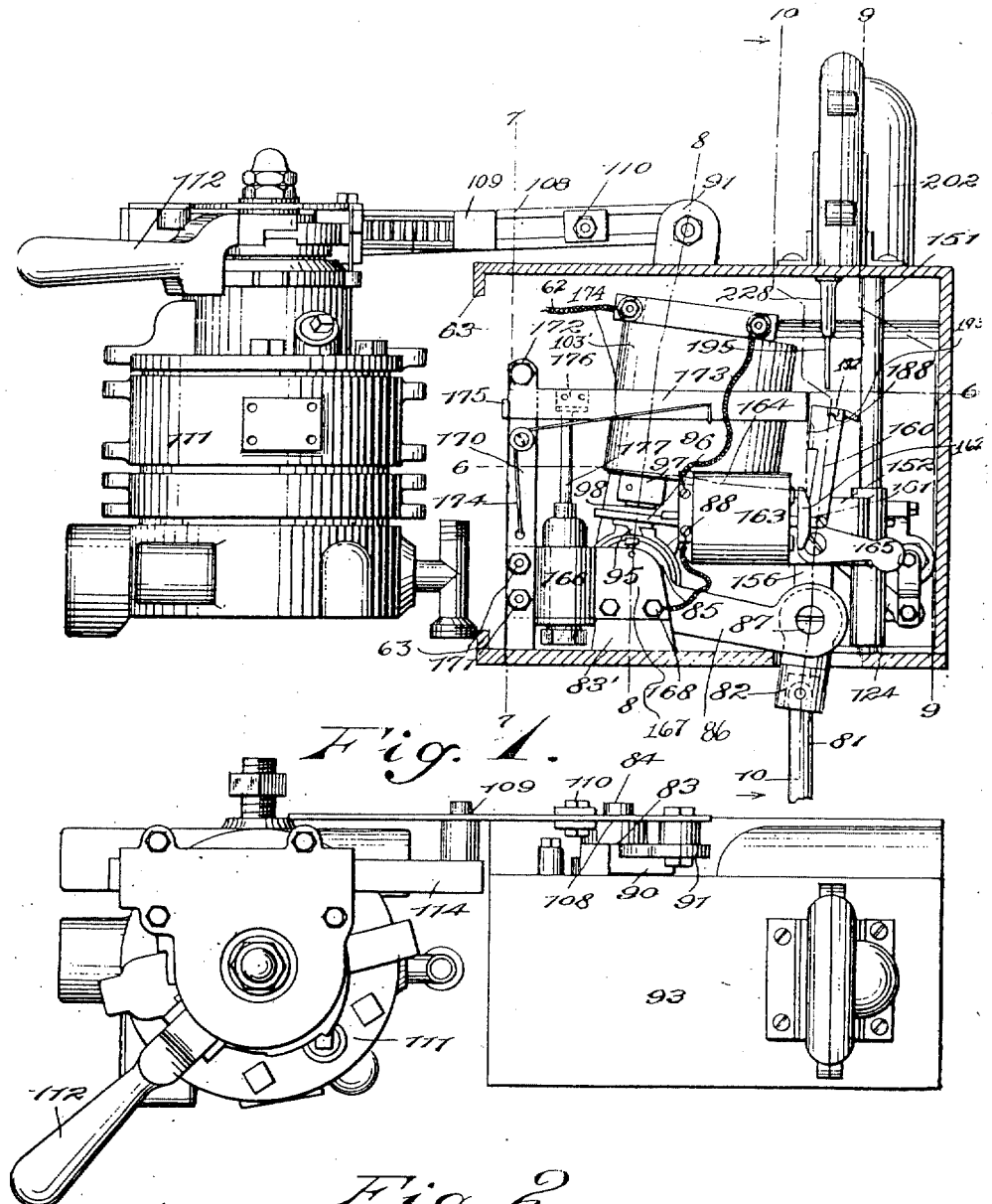

1,213,892.

Patented Jan. 30, 1917.
11 SHEETS—SHEET 2.

Witnesses
J. Milton Jester
Eugene Murray

Inventor
W. B. Murray,
By C. M. Parkin
Attorney

W. B. MURRAY.
TRAIN CONTROL SYSTEM.
APPLICATION FILED FEB. 10, 1913.
1,213,892.
Patented Jan. 30, 1917.
11 SHEETS—SHEET 3.
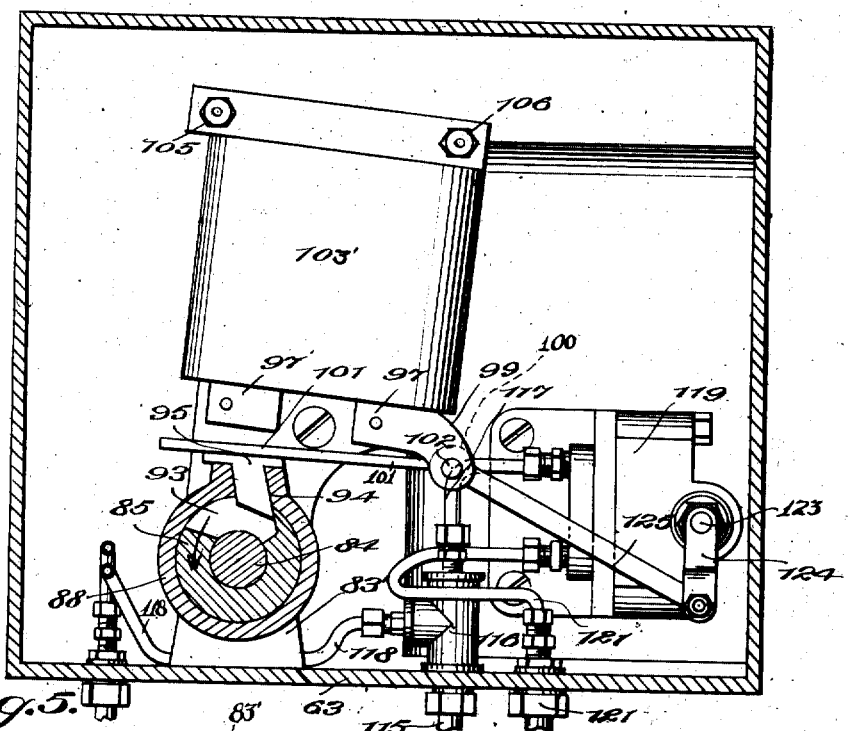

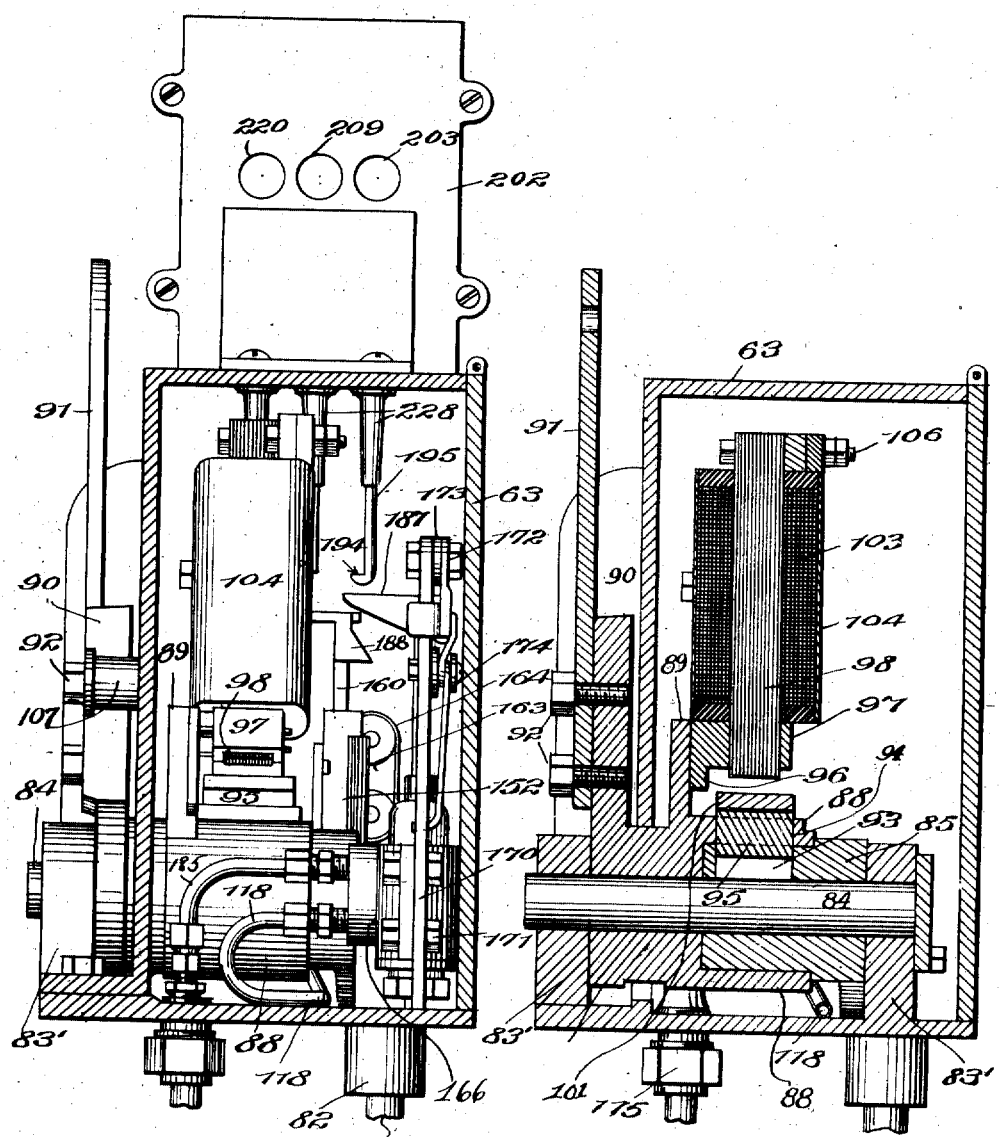

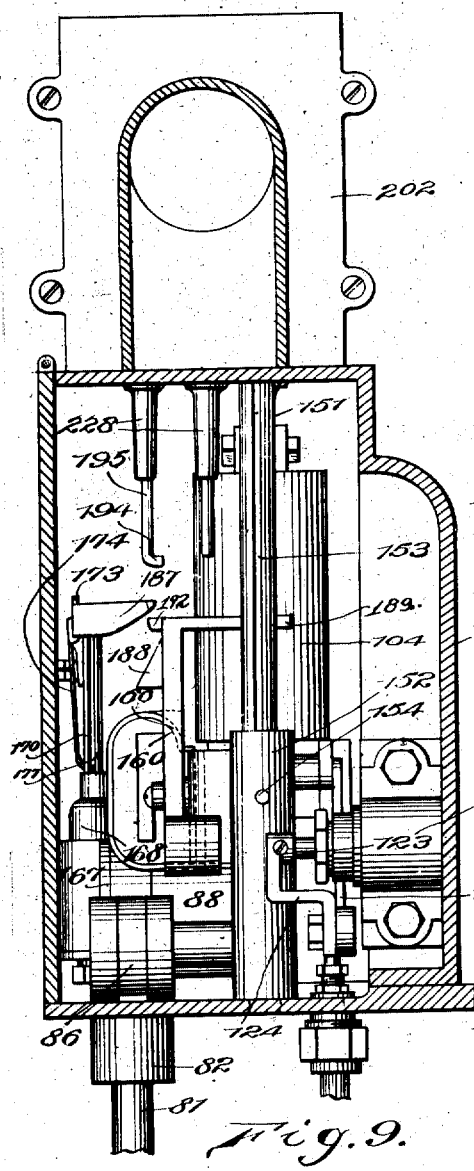

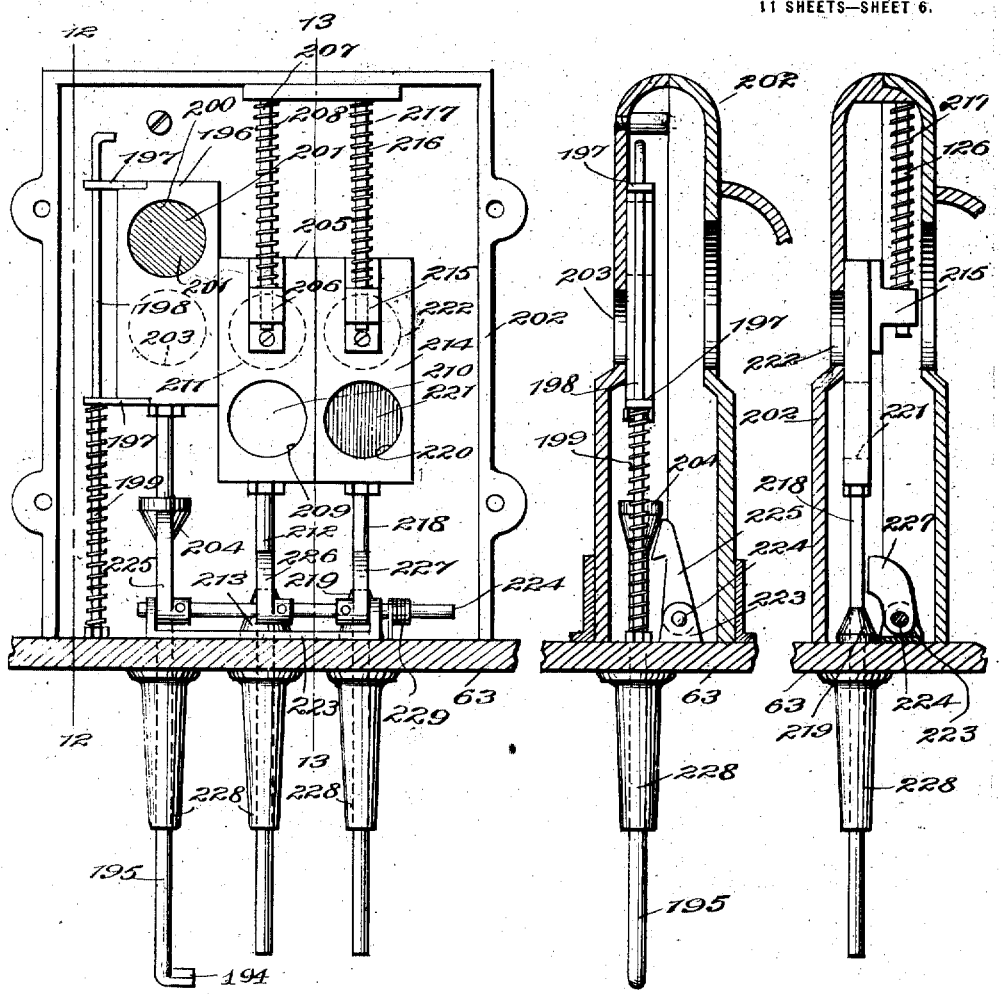

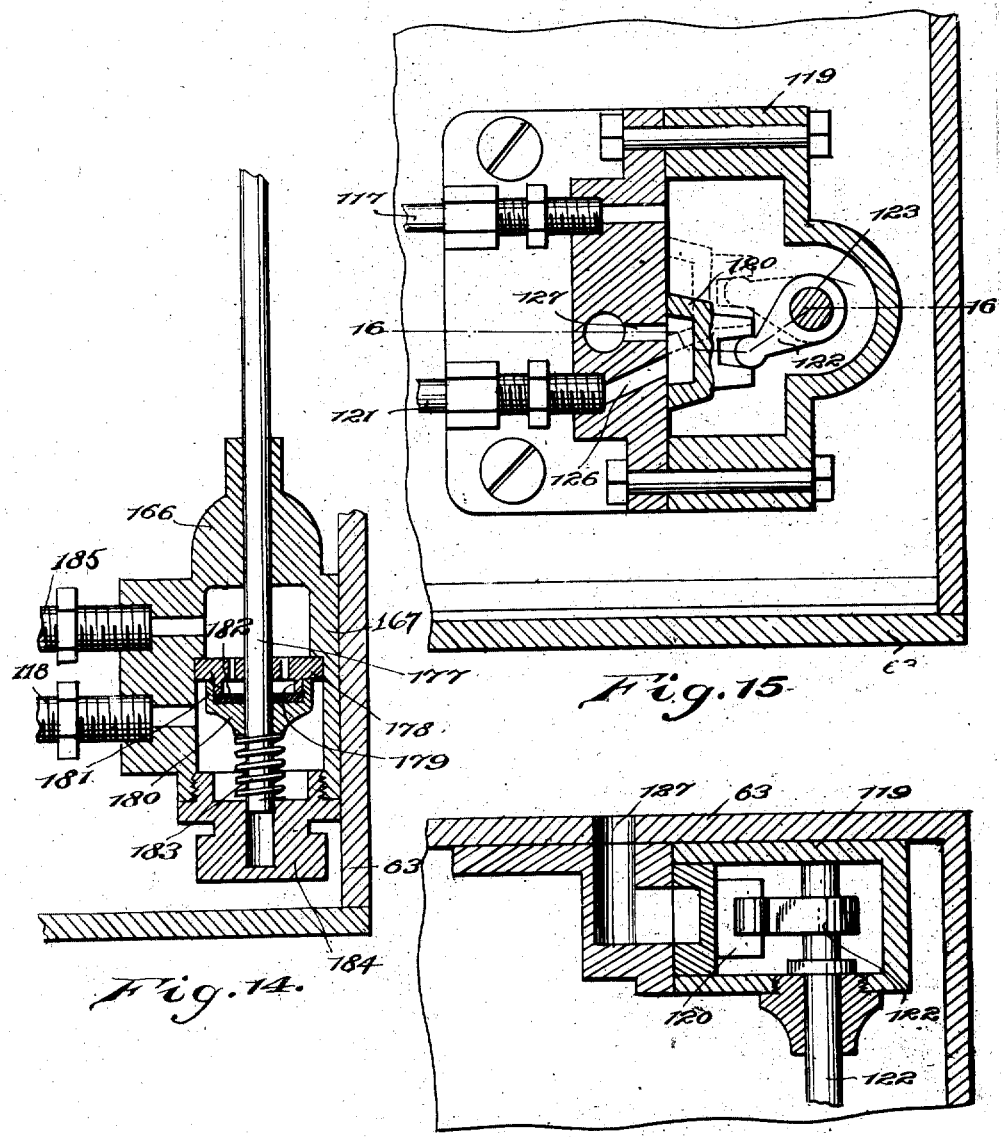

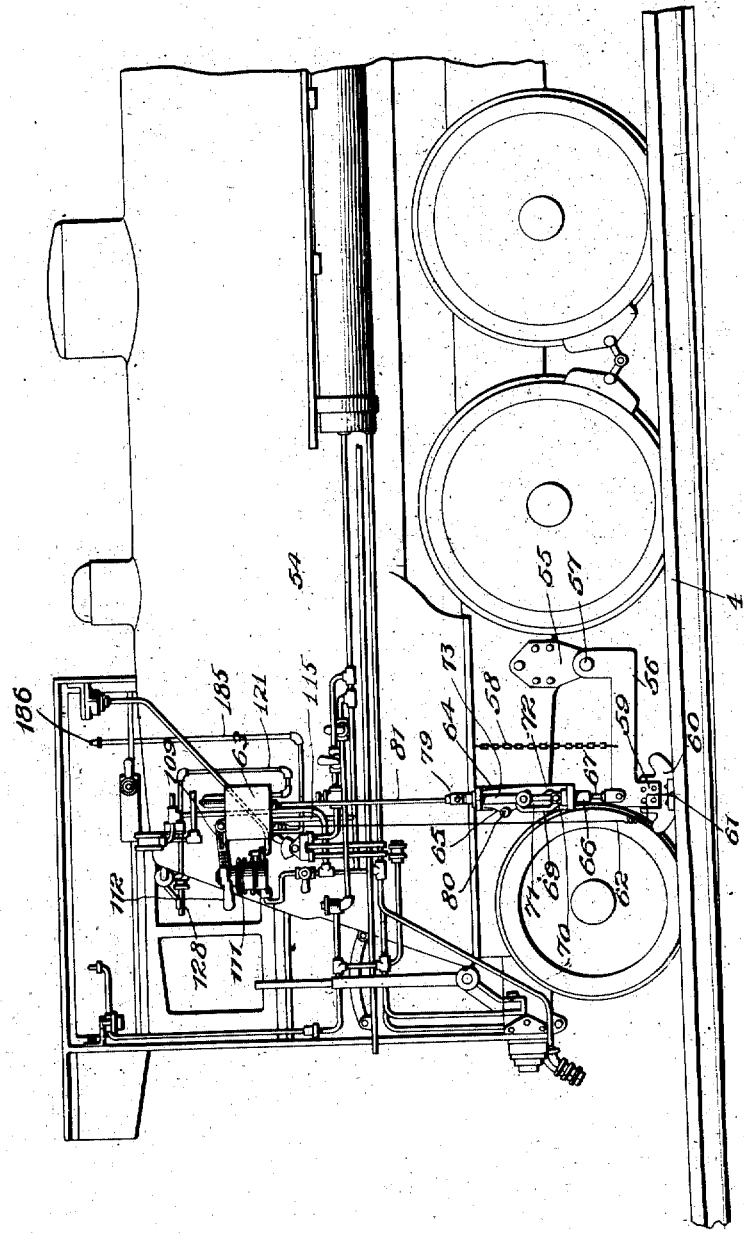

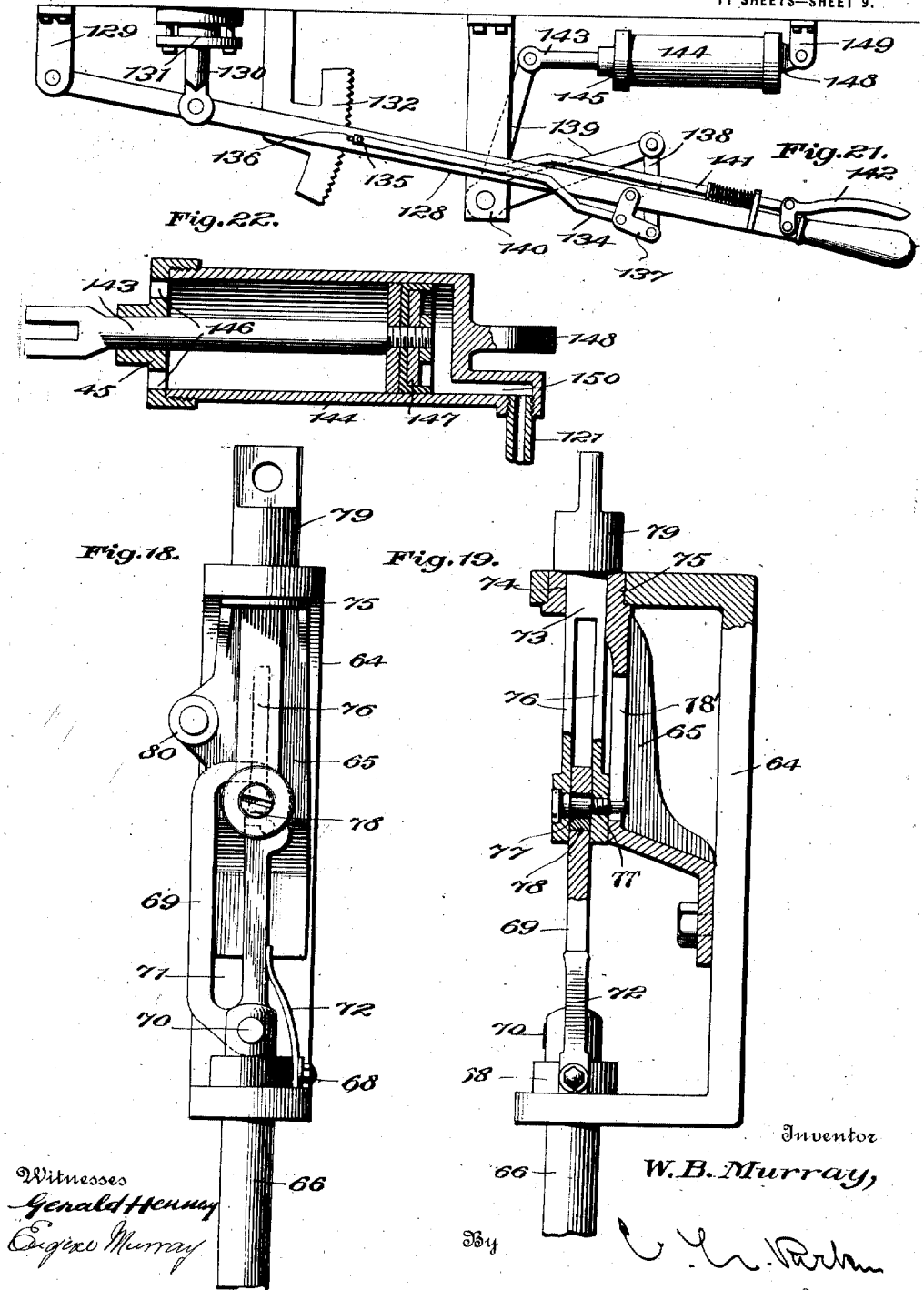

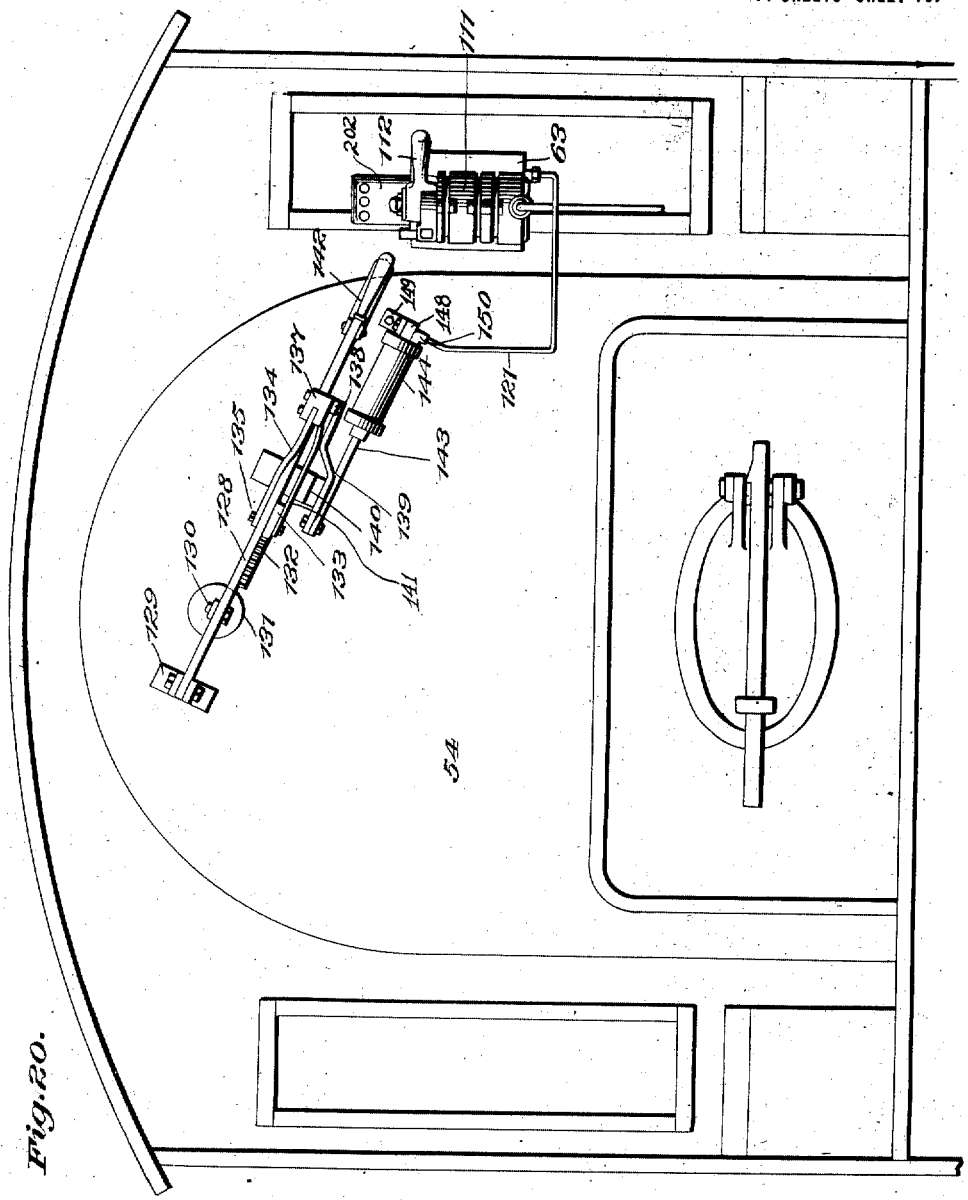

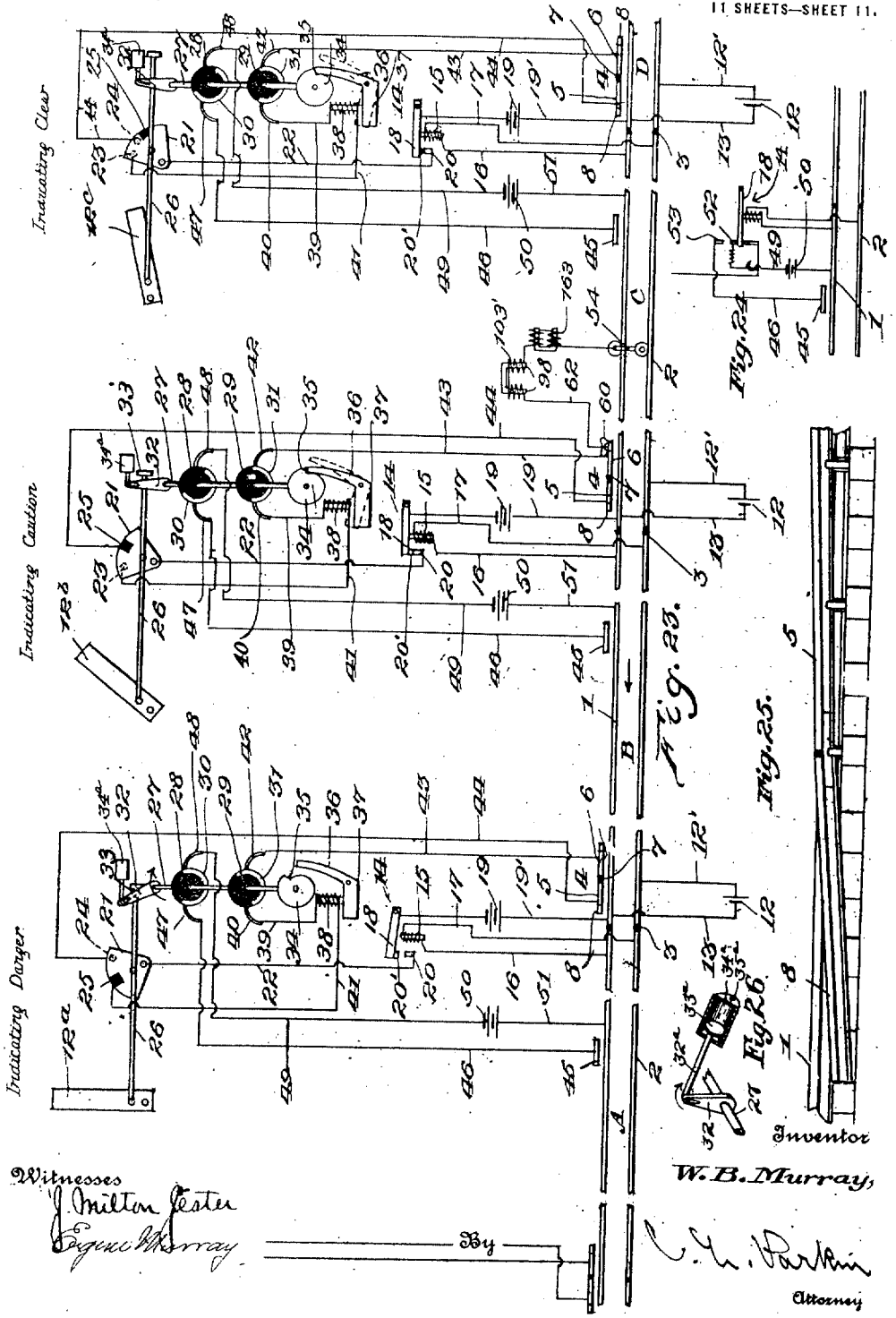

UNITED STATES PATENT OFFICE.

WILLIAM B. MURRAY, OF WASHINGTON, DISTRICT OF COLUMBIA, ASSIGNOR TO THE MILLER TRAIN CONTROL CORPORATION, OF STAUNTON, VIRGINIA, A CORPORATION OF VIRGINIA.

TRAIN-CONTROL SYSTEM.

1,213,892.   Specification of Letters Patent.   Patented Jan. 30, 1917.

Application filed February 10, 1913. Serial No. 747,498.

*To all whom it may concern:*

Be it known that I, WILLIAM B. MURRAY, a citizen of the United States, residing at Washington, in the District of Columbia, have invented certain new and useful Improvements in Train-Control Systems, of which the following is a specification.

My invention relates to train control systems, adapted for use in connection with steam and electric railways for preventing collisions and other accidents.

An important object of this invention is to provide a system of the above mentioned character, which will automatically operate in times of danger to stop the train, irrespective of the inattention or disability of the engineer, the stopping of the train being effected by cutting off the source of power and applying the brakes or by applying the brakes alone.

A further object of the invention is to simplify the part of the system or apparatus which is mounted upon the engine, whereby the same will take up the least space, will be simple in construction and cheap to manufacture.

A further object of my invention is to provide a novel form of signal means operating in conjunction with the train stopping means, and preferably disposed at a suitable position within the cab, to indicate the three conditions of the block or track, to wit, "clear," "caution" and "danger."

A further object of my invention is to provide a system of the above mentioned character, which will give the engineer a signal in the cab which is true to the track or block condition, which will automatically take care of the train in the event that the signals go unheeded, and will not take the engine out of the active control of the engineer.

Other objects and advantages of the invention will be apparent during the course of the following description.

Figure 3:
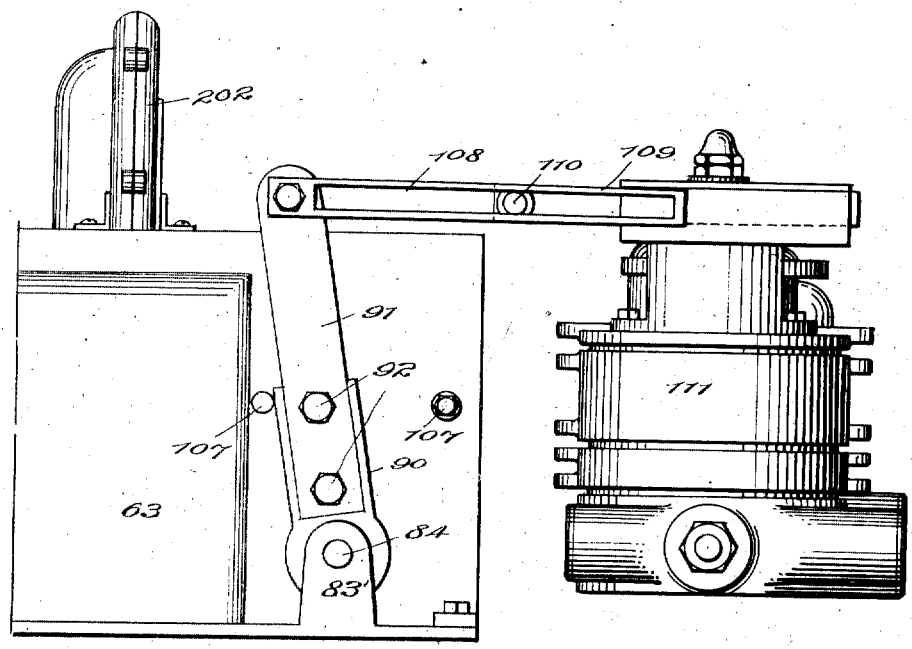
Figure 4:
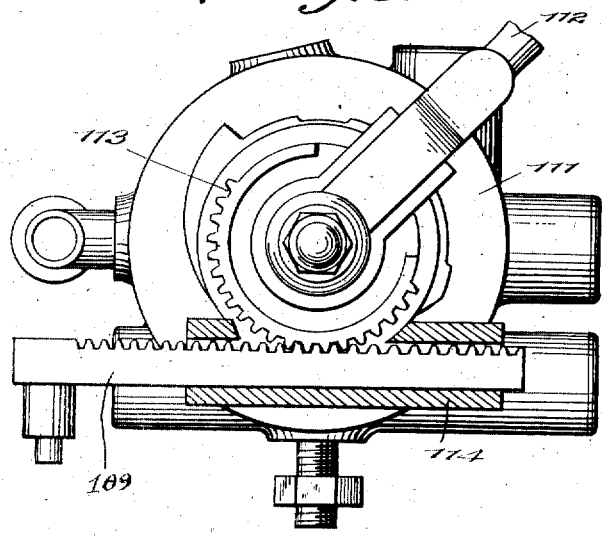

In the accompanying drawings forming a part of this specification and in which like numerals are employed to designate like parts throughout the same, Figure 1 is a side view of the mechanically operated and electrically controlled mechanism, and the air brake valve, the casing of the mechanism being shown in section for the sake of clearness, Fig. 2 is a plan view of the same, Fig. 3 is an elevation of the opposite side of the same, Fig. 4 is a plan view of the air brake valve, parts thereof being shown in section for the sake of clearness, Fig. 5 is a vertical sectional view taken on line 5—5 of Fig. 6, parts thereof being omitted, Fig. 6 is a horizontal sectional view taken on line 6—6 of Fig. 1, parts being in elevation, Fig. 7 is a transverse vertical sectional view taken on line 7—7 of Fig. 1, Fig. 8 is a similar view taken on line 8—8 of Fig. 1, Fig. 9 is a similar view taken on line 9—9 of Fig. 1, Fig. 10 is a similar view taken on line 10—10 of Fig. 1, Fig. 11 is an inner side view of the signal apparatus, a portion of the shell being removed to more clearly show the operating parts thereof, Fig. 12 is a transverse sectional view taken on line 12—12 of Fig. 11, Fig. 13 is a similar view taken on line 13—13 of Fig. 11, Fig. 14 is an enlarged detail section through the valve which operates the whistle, Fig. 15 is a similar view through the valve which controls the passage of compressed air to the throttle lever cylinder, Fig. 16 is a horizontal sectional view taken on line 16—16 of Fig. 15, Fig. 17 is a side view of an engine equipped with the entire apparatus, Fig. 18 is an enlarged front view of the connecting means between the shoe and the mechanically operated and electrically controlled mechanism, Fig. 19 is a side view of the same, parts being shown in section, Fig. 20 is a rear end view of the engine boiler taken in the cab, showing the means to operate the throttle lever and air brake valve, Fig. 21 is a plan view of the throttle lever and operating means therefor, Fig. 22 is a longitudinal sectional view through the throttle lever cylinder, Fig. 23 is a diagrammatic view of the track and circuits associated therewith, Fig. 24 is a diagrammatic view with a slightly different form of means for connecting and disconnecting the third ramp with a source of current, Fig. 25 is an enlarged side view of the end of one ramp, and, Fig. 26 is a detailed section through the dash pot which causes the rock-shaft 27 to turn slowly.

In the drawings, wherein for the purpose of illustration, I have shown a preferred embodiment of my invention, (attention being called more particularly to Fig. 23,) the numerals 1 and 2 designate track rails, insulated at spaced intervals, as shown at 3, to provide blocks A, B, C, and D of suitable lengths. As indicated by the arrow, the traffic is in one direction, to wit, from right to left. Disposed preferably outwardly of the track rail 1 and suitably near the entrance end of each block is a ramp 4, which is inclined longitudinally upwardly in a vertical plane and comprises ramp sections 5 and 6, insulated from each other, as shown at 7. At their outer ends, the ramp sections are connected with and insulated from extensions 8 (see Fig. 25). These extensions never have connection with the source of current and extend below the track rail 1 to engage the road bed. As above stated, the extensions 8 never have connection with any source of current and serve to slightly mechanically operate the mechanism before it is operated by the ramp sections, but this operation is not sufficient to actuate the train stopping means, as will be apparent hereinafter. The ramp sections 5 and 6 and extensions 8 may be formed of ordinary track rails and are held in place by any suitable means.

At the right or entrance ends of the blocks A, B, and C are disposed semaphores comprising vertically swinging paddles $12^a$, $12^b$, and $12^c$, respectively. It is to be understood that like semaphores are placed at the entrance ends of the remaining blocks. The semaphore paddles are adapted to assume three positions, to wit, a horizontal to indicate danger, as shown by the paddle $12^a$, an intermediate position to indicate caution, as shown by the paddle $12^b$, and a lowermost position to indicate a clear block, as shown by the paddle $12^c$. These semaphore paddles may be either manually moved or operated by any ordinary electrically controlled system or systems. The ramp sections 5 and 6 being disposed suitably near the entrance ends of the blocks, control the passage of the engine or train from one block to the right into the next block to the left.

At the exit end of each block is disposed a source of current 12 connected by a wire 12' with the rail 2 and connected with the rail 1 by a wire 13. Disposed at the entrance end of each block is a relay 14, comprising an electro-magnet 15, having its winding connected with the rails 1 and 2 by wires 16 and 17, as shown. Disposed near the electro-magnet is an armature 18, which is held adjacent such electro-magnet when the same is energized but will automatically move away from the same when it is deënergized. As long as the block is clear or unoccupied by an engine or train, it is obvious that a track circuit is closed and the electro-magnet 15 will remain energized. In this closed circuit, current flows from one side of the source of current 12, through wire 12', rail 2, wire 17, electro-magnet 15, wire 16, rail 1, wire 13, and back to the opposite pole of the source of current 12. When an engine travels into the entrance end of the block, the above referred to circuit is made through the engine and the electro-magnet 15 is cut out of circuit and deënergized, the current being short circuited through the engine.

The numeral 19 designates a source of current having one pole thereof connected with a wire 19', which is connected with the rail 1 and its opposite pole electrically connected with the armature 18, as shown.

The numeral 20 designates a stationary contact disposed near the armature 18 and adapted to be engaged by a contact 20', carried by said armature, when the electro-magnet 15 is energized. The engagement between the contacts 20 and 20' is broken when the electro-magnet 15 is deënergized. The stationary contact 20 has electrical connection with a pivoted metal contact segment 21, through the medium of a wire 22, as shown. The segment 21 coöperates with stationary contacts 23 and 24 and is provided at its curved edge intermediate the ends thereof with an insulating block 25, as shown. The contact segment 21 swings in a vertical plane and is adapted to assume three positions, to wit, an upper to bring the insulating block 25 into engagement with the stationary contact 23 and the metal portion thereof into engagement with the stationary contact 24, an intermediate position to bring the metal portion thereof into engagement with the stationary contact 23 and the insulating block 25 into engagement with the stationary contact 24, and a lowermost position to bring the metal portion thereof into engagement with both stationary contacts 23 and 24. The contact segment 21 is moved synchronously with its signal paddle and has operative connection therewith through the medium of a rigid rod 26, pivotally connected with the paddle and the segment, as shown.

Disposed near each of the contact segments 21 is a switch device comprising a horizontal rock-shaft 27, carrying insulating rolls 28 and 29, provided respectively with metallic contact segments 30 and 31, as shown. The rock-shaft 27 is turned in one direction, as indicated by the arrow, by a gravity operated crank arm 32, having a suitable opening formed therethrough to receive the rod 26, such rod being provided at its lower end with a head 33. Rigidly connected with one end of the rock-shaft 27 is a disk 34, provided with a shoulder 35, adapted to be engaged by a pivoted holding pawl 36. This holding pawl is returned to and retained in its normal position by its horizontal arm 37. When this holding pawl is in its normal position, its vertical arm engages the shoulder 35 and thus prevents the turning of the rock-shaft 27 in one direction. The horizontal arm 37 of the holding pawl 36 is moved to release the rock-shaft 27 in order that the crank arm 32 may swing downwardly, as indicated by the arrow, by an electro-magnet 38 having one end of its winding connected with a wire 39, which is connected with a contact 40, adapted to engage the contact segment 31, when the rock-shaft 27 is in its normal position. The opposite end of the winding of the electro-magnet 38 is connected with a wire 41, having its opposite end connected with the stationary contact 23. The contact segment 31 is also engaged when in its normal position by a contact 42, connected with a wire 43, which is connected with the ramp section 6. Connected with the stationary contact 24 is a wire 44, which is connected with the ramp section 5, as shown.

Pivotally connected with the outer end of each of the gravity operated cranks 32, is a pitman 32$^a$, suitably connected with a piston 33$^b$ included in a dash pot. This piston is mounted to reciprocate within a cylinder 34$^a$, having a small or contracted air outlet 35$^a$. The cylinder 34$^a$ is of course held stationary or fixed by any suitable means. By this construction, when the rock-shaft 27 is released, the gravity operated crank 32 will turn the same slowly, in the direction of the arrow. The dash pot is so timed in its operation that a shoe (hereinafter designated by the numeral 60) carried by the engine will have time to travel longitudinally of the ramp section 6 to or past the insulation 7, before the engagement is broken between the contacts 31 and 42, such engagement however being broken by the time the engine enters the next block to the left or by the time the shoe is engaging the ramp section 5. Any suitable means may be employed to make the shaft 27 turn slowly.

Disposed near and inwardly of the entrance end of each block is an auxiliary or third ramp 45, which is curved upwardly longitudinally in a vertical plane. This auxiliary ramp is connected with a wire 46, which is connected with a contact 47, which always remains in electrical connection with the contact segment 30.

The numeral 48 designates a co-acting contact, which engages the contact segment 30 only when the rock-shaft 27 is turned upwardly upon the semaphore paddle being moved to its uppermost or danger position. The contact 48 is connected with a wire 49 connected with one pole of a source of current 50, having its opposite pole connected with the track rail 1 by a wire 51, as shown. If the train is traveling quite fast and the semaphore paddle should be slowly swung toward its upward or danger position, the train might reach the auxiliary ramp 45 before the paddle had time to complete its upwardly movement. The train would then be improperly stopped by the time the paddle had reached the danger or stop position. To overcome this difficulty, I adjustably mount the roll 28 upon the rock-shaft 27, so that the roll may be unlocked therefrom and turned with relation thereto, and subsequently locked to the rock-shaft 27. By thus turning the roll 28 with relation to the rock-shaft 27, one end of the segment 30 may be brought sufficiently near the contact 48, so that it will engage said contact 48, when the semaphore paddle is swung upwardly to or near its intermediate position and before it reaches the uppermost position.

In Fig. 24, I have shown an auxiliary ramp 45 connected with the source of current 50 through means which are operated by the relay 14. In this figure, the numeral 52 designates a contact which is rigidly connected with but insulated from the armature 18, as shown. The wire 49 is connected with the contact 52. The numeral 53 designates a stationary contact which is engaged by the contact 52 only when the relay 14 is deënergized. Wire 46 is connected with the stationary contact 53. When the train enters the block, the electro-magnet 15 of the relay 14 is deënergized and the armature 18 will move away from said electro-magnet, whereby the contacts 52 and 53 will engage each other. It is thus seen that the ramp 45 will then be electrically connected with the source of current 50. Should the armature 18 stick and not open, the auxiliary ramp 45 will have no electrical connection with the source of current, whereby the train will be stopped by the same, as will be apparent hereinafter.

In Fig. 17, is shown a locomotive 54, to one side and near the rear end of which is secured a bracket 55, to which is pivotally connected a vertically swinging arm 56, as shown, at 57. The numeral 58 designates a normally slack chain, or other flexible element, which is attached to the securing arm 56 and to the body of the locomotive, as shown. At its lower end, the securing arm 56 has a depending portion 59, to which is secured a shoe 60 insulated therefrom. This shoe is provided between its ends with a recess, for receiving a hard steel block 61, having electrical connection with the shoe and held in place by any suitable means. A wire 62 is electrically connected with the shoe 60 and extends upwardly for electrical connection with the mechanically operated and electrically controlled mechanism, which is mounted within a shell or casing 63, arranged as shown.

Rigidly connected with the locomotive (see Figs. 17, 18 and 19) is a bracket 64 within which is mounted a supporting element 65. This supporting element is connected with the bracket by any suitable means. The lower arm or horizontal portion of the bracket 64 is provided with an opening to receive a vertically movable shaft 66, which is rigidly connected with a depending rod 67. At its lower end this depending rod is forked to straddle the securing arm 56 and is pivotally connected therewith, as shown. The shaft 66 is provided with a ring or collar 68, which is rigidly connected therewith and preferably formed integral with the same. This collar serves to positively limit the downward movement of the shaft 66. The upper end of the shaft 66 is forked to receive the lower end of a vertically swinging link 69, pivotally connected therewith, as shown at 70. This swinging link is provided with an inverted L-shaped slot or opening 71. Connected with the collar 68 is a leaf-spring 72, which engages the link 69 to normally hold the same in its vertical or operative position.

The numeral 73 designates an upper reciprocatory shaft, which is preferably formed square in cross-section and operates within an opening 74 formed through an extension 75 of the support 65. The shaft 73 is forked to provide spaced parts or arms 76, between which is disposed the pivoted link 69. Between the parts 76 and at the lower ends thereof is disposed a roller 77, mounted upon a pin 77′, having a portion thereof disposed in a slot 78′. The roller 77 engages the horizontal shoulder 78 of the inverted L-shaped slot 71. The shaft 73 is provided with an enlarged head 79, which positively limits the downward movement of the same. Rotatably mounted upon the support 65 is a roller 80, which is engaged by the upper curved portion of the pivoted link 69, when the same is vertically moved. It is thus seen that when the lower shaft 66 is first moved vertically the same will move the shaft 73 vertically, until the link 69 engages the roller 80, at which time the link 69 is swung laterally whereby the shoulder 78 will clear the roller 77. Upon further vertical movement of the shaft 66 the same cannot further elevate the shaft 73. It is thus seen that means are provided whereby the shaft 73 will be moved just a desired distance when the shoe travels in engagement with the ramp, such means becoming automatically inoperative to move the shaft after said shaft has moved a desired distance. Pivotally connected with the upper end of the shaft 73 is a vertically extending rod 81, which is pivotally connected with a socket 82, as more clearly shown in Fig. 10.

Rigidly mounted upon the base of the shell or casing 63 (see Figs. 5 to 10) are upstanding bearings 83′, through which is journaled a horizontal shaft 84, as shown. Pivotally mounted upon the shaft 84 is a sleeve 85, having a crank 86 connected and preferably cast integral therewith. The outer end of the crank 86 is forked to receive the upper end of the socket 82, these parts being pivotally connected as shown at 87. Pivotally mounted upon the sleeve 85 is a vertically swinging support or casting comprising a sleeve 88 and upstanding cranks 89 and 90, as more clearly shown in Fig. 8. The crank 90 is provided with a longitudinal groove or recess for receiving an upstanding lever 91, these parts being held together by bolts 92 or the like, as shown. The sleeves 85 and 88 are provided with openings 93 and 94 respectively, (see Fig. 5) which are adapted to be moved into registration. Disposed within the opening 94 is a latch or bolt 95, which is adapted to rigidly connect the sleeves 85 and 88, when the same is in its lowermost position, as clearly shown in Fig. 5. When the bolt 95 is in its lowermost or inner position, it is obvious that upon the upwardly swinging movement of the crank 86, the lever 91 will be vertically swung.

Rigidly mounted upon the crank 89 is a plate 96, carrying eyes or sockets 97, as more clearly shown in Figs. 6 and 8. These sockets receive the lower ends of a horse shoe core 98 of an electro-magnet 103′ and thus serve to rigidly connect the electro-magnet, with the crank 89. The horse shoe core 98 is formed of thin sheets of laminated soft iron thus providing a magnet which may be used with either direct or alternating current. Formed upon one of the sockets 97 are spaced ears 99, between which is disposed an apertured head 100 carried by a vertically swinging armature 101. A pin 102 or the like serves to pivotally connect the head 100 and the ears 99. The bolt 95 is rigidly connected with the armature 101.

The numeral 103 designates the electro-magnet coils or windings, which receive therethrough the horse shoe core 98. These coils 103 are connected in series and are preferably inclosed in a shell or casing 104, of non-magnetic material as shown.

The numerals 105 and 106 designate binding posts connected with the ends of the coils 103. It is obvious that when the electro-magnet 103′ is deënergized, upon the upward movement of the crank 86, the sleeves 85 and 88 will be locked together, whereby the electro-magnet and the lever 91 will both be swung laterally in the same direction. If, however, the electro-magnet is energized, the armature 101 being elevated, will unlock the sleeves 85 and 88, thus allowing the sleeve 85 to turn within the sleeve 88. The electro-magnet 103′ and the lever 91 will now remain stationary when the crank 86 is swung upwardly.

The numeral 107 (see Figs. 3 and 7) designates stops disposed upon opposite sides of the crank 90, as shown. Pivotally connected with the upper end of the lever 91 is a pitman or link 108, having pivotal connection with a rack-bar 109, as shown at 110.

The numeral 111 designates an air brake valve as a whole. This air brake valve is arranged in the usual position in the cab. Attention is called to the fact that the casing 63 holding the mechanically operated and electrically controlled mechanism is disposed to the front of the air brake valve. The air brake valve may be manually operated by a lever 112 and the same is automatically operated by a pinion 113 which is rigidly connected with the lever 112 or with the valve stem. This pinion 113 is engaged by the rack-bar 109, such rack-bar operating within a guide-casing 114, as shown.

The numeral 115 (see Figs. 5 and 17) designates an air pressure supply pipe having connection with a source of compressed air, as shown. This pipe 115 is connected with a T-coupling 116, having connection with pipes 117 and 118, as shown. The pipe 117 leads into a valve shell 119, as clearly shown in Fig. 15, which is rigidly connected with the shell 63. Movably mounted within the shell 119 is a valve 120, to control the passage of the compressed air through pipe 121. This pipe 121 is connected with a cylinder, to be described, which operates the throttle lever. The valve 120 is shifted by a crank 122, which is rigidly mounted upon a rock-shaft 123. Rigidly connected with the rock-shaft 123 is a depending crank 124, (see Fig. 5) having pivotal connection at its lower end with a pitman or link 125, which is pivotally connected with the ears 99 by means of the pin 102, as more clearly shown in Fig. 5. When the electro-magnet 103′ is in its normal position, the valve 120 will occupy a position to cut off the supply of compressed air to the pipe 121. When this electro-magnet is swung laterally from its normal position, the valve 120 will be shifted whereby the compressed air will be fed to the pipe 121. In Fig. 15 the valve 120 is shown in a position to cut off the supply of compressed air to the pipe 121, the same then serving to establish communication between the interior of the pipe 121 and the atmosphere through ports 126 and 127. When the valve is shifted or moved upwardly, the port 126 is uncovered, while the valve still covers the port 127, thus placing the pipes 117 and 121 in free communication with each other through the shell 119. The position that the valve 120 will occupy when elevated is shown by the dotted lines.

The numeral 128 designates a throttle lever, (see Figs. 20 and 21) having pivotal connection with a fixed bracket 129, as shown. Pivotally connected with the throttle lever 128 is a valve stem 130, connected with the valve or throttle. The valve stem 130 operates through a suitable stuffing box 131.

The numeral 132 designates a fixed or stationary segment, disposed below the throttle lever 128. A spring pressed reciprocatory latch 133 is adapted to engage the teeth of the segment 132. This latch is moved to release the throttle lever by a longitudinally extending rod 134, connected with the latch by a bolt or pin 135, operating through a longitudinal slot 136. The outer end of the rod 134 is pivotally connected with a bell-crank lever 137, which is in turn pivotally connected with the throttle lever, as shown. Pivotally connected with the free end of the bell-crank lever 137 is a link 138, having connection with a bell-crank lever 139. This bell-crank lever is pivotally mounted upon a fixed support or bracket 140, as shown. The latch 133 may be manually moved by a rod 141, connected with a hand grip 142, and bolt 135, as shown. Pivotally connected with the inner arm of the bell-crank lever 139 is a piston rod 143, extending into a cylinder 144, having its head 145 apertured, as shown, at 146. The piston rod 143 is connected with a piston 147, as shown. The cylinder 144 is adapted to swing bodily and the same is provided at one end with an apertured extension or ear 148, having pivotal connection with a fixed bracket or support 149. The cylinder 144 is provided adjacent the ear 148 with an inlet pipe 150, connected with the pipe 121, there being a suitable swiveled connection to allow the slight swinging movement of the cylinder. It is thus seen that when compressed air or the like is supplied into the cylinder 144, the latch 133 will be moved to release the throttle lever, subsequently to which the throttle lever will be swung inwardly to cut off the supply of steam.

The numeral 151 (see Figs. 1 and 5 to 9 inclusive) designates a stationary or fixed upstanding guide rod or track upon which is vertically movably mounted a carriage 152. The guide rod 151 is preferably provided with a longitudinal groove 153 for receiving the inner end of a pin 154, secured to the carriage, whereby such carriage is splined upon the guide rod 151. The carriage 152 comprises a laterally extending arm 155, to which is pivotally connected a depending link 156, by means of a screw or bolt 157, passing through an enlarged head 158 of the link 156. At its lower end the link 156 carries a stub shaft 159, which passes through the socket 82 and the forked end of the crank 86, such stub shaft serving to pivotally connect these parts, as hereinabove described. The stub shaft 159 is held against displacement by the screw 87. The bolt 157 serves to pivotally connect a bell-crank lever 160 with the arm 155. The bell-crank lever 160 has a link 161 connected therewith, such link carrying an armature 162, disposed adjacent an electro-magnet 163, as shown. The electro-magnet is rigidly connected with the arm 155 of the carriage. The electro-magnet 163 is constructed similar to the first named electro-magnet, that is it has a horse shoe core formed of laminated sheets of iron, so that the magnet may be used with either direct or alternating current. The electro-magnet 163 is preferably inclosed within a shell 164 of non-magnetic material, through which the link 161 operates and is thereby guided in its slight longitudinal movement. The swinging movement of the bell-crank lever 160, in one direction, is limited by the engagement of the same with the guide rod 151. The lower arm of the bell-crank lever 160 is in the form of a weight or enlarged head 165. It is thus seen that when the electro-magnet 163 is energized, the armature 162 will be drawn toward the same whereby the bell-crank lever 160 will be swung in the same direction. The electro-magnet 163 being connected with the carriage 152 moves vertically with the bell-crank lever 160. The two electro-magnets are connected in series and are consequently simultaneously energized and deënergized, (see block C in Fig. 23). The electro-magnet 163 has one end of its winding connected or grounded with the framework of the engine.

The pipe 118 (see Figs. 5, 7, and 14) leads into the lower portion of a valve shell 166, which is rigidly connected with a flat plate 167, which is in turn rigidly connected with one of the upstanding bearings 83' by means of bolts 168, as shown. Connected with an extension or plate 169 formed upon the valve shell 166 is an upright or post 170, these parts being held together by bolts 171 or the like. Pivotally connected with the upper end of the post 170, as shown at 172, is a vertically swinging lever 173, which is forced upwardly by a spring 174. The upward movement of the lever 173 is limited by a laterally extending stop or finger 175, carried thereby and engaging the post 170, as shown. The lever 173 has a depression element 176 connected therewith, which engages the upper end of a valve stem 177. This valve stem reciprocates through a perforated stationary valve seat 178, which carries a depending annular flange 179. Rigidly connected with the valve stem 177 is a valve 180, provided with an upstanding annular flange 181, to receive the inner flange 179. The valve 180 has a section of packing 182 disposed therein, which is engaged by the annular flange 179. The valve 180 is normally held seated by a compressible spring 183, which engages the same and a removable plug 184, serving to close the lower end of the valve shell or casing 166.

The numeral 185 designates a pipe which leads into the shell 166 above the valve seat 178, as shown. The pipe 185 is connected with a whistle 186, suitably arranged within the cab. It is obvious that when the lever 173 is swung downwardly, the valve stem 177 will be moved downwardly, whereby the valve 180 will be unseated and communication established between the pipes 118 and 185, to cause the whistle 186 to sound. The lever 173, as clearly shown in Fig. 9, is provided with a lateral extension 187 which will be engaged or not engaged by an extension 188 formed upon the upstanding arm of the bell-crank lever 160, depending upon whether or not the electro-magnet 163 is energized or deënergized. Attention is called to the fact that extensions 187 and 188 have their lower and upper faces respectively beveled. When the carriage 152 has been elevated and begins to descend, the extension 188 will engage the extension 187, if the electro-magnet 163 is deënergized. If this magnet should be energized, the extension 188 will not engage the extension 187 upon the downward movement of the carriage 152. It is obvious that when the extension 188 engages the extension 187, as above stated, the lever 173 will be swung downwardly for operating the whistle 186.

Rigidly connected with the upper end of the upstanding arm of the bell-crank lever 160 is a horizontal plate 189, provided with openings 190 and 191, which are disposed in different vertical planes, the opening 191 being disposed inwardly of the opening 190. At one end the horizontal plate 189 is provided with an extension or lug 192, provided upon its lower surface with a groove or recess 193, which is preferably V-shaped in cross-section to receive an extension 194 formed upon the lower end of a reciprocatory rod 195, the extension 194 having a V-shaped upper portion, as shown. The reciprocatory rod 195 operates a caution signal 196, which is in the form of a plate carrying apertured ears or extensions 197, movably mounted upon a fixed guide rod 198. A compressible coil spring 199 surrounds the rod 198 and tends to move the plate 196 upwardly and will return the same to its uppermost position when released. The plate 196 is provided with an opening 200, which is closed by a section of green glass 201, which is the ordinary color employed to designate caution.

The numeral 202 designates a portion of a shell or casing which surrounds or incloses these parts. The shell 202 is provided with an opening 203, to be in registration with the opening 201 when the plate 196 is lowered. Rigidly mounted upon the reciprocatory rod 195 is a conical element or head 204, which decreases in diameter downwardly. The clear signal device comprises a reciprocatory plate 205 carrying an apertured bracket 206, which is slidably mounted upon a depending fixed guide rod 207. A compressible coil spring 208 surrounds the guide rod 207 and engages the bracket 206 to move the plate 205 downwardly, when the same is released. The plate 205 is provided with an opening 209, which is closed by a section of white glass 210. The opening 209 is adapted to be moved into registration with an opening 211 formed through the shell 202. Connected with the lower end of the plate 205 is a depending rod 212, having a conical head 213 rigidly mounted thereon, which conical head increases in diameter downwardly. The danger signal comprises a reciprocatory plate 214, carrying an apertured bracket 215 which receives a depending fixed guide rod 216, there being a spring 217 to force the plate 214 downwardly when the same is released. Rigidly connected with the lower end of the plate 214 is a reciprocatory rod 218, having a conical head 219 rigidly connected therewith, such conical head increasing in diameter downwardly. The plate 214 is provided with an opening 220, which is closed by a section of red glass 221, which is the color ordinarily employed to indicate danger. The opening 220 is adapted to be moved into registration with the opening 222, formed through the shell 202.

The numeral 223 designates a fixed bracket, having a horizontal rock-shaft 224 journaled therethrough. Rigidly mounted upon the rock-shaft 224 are holding pawls 225, 226, and 227, to engage respectively the heads 204, 213, and 219. The pawl 225 is adapted to hold the head 204 against upward movement, the pawl 226 to hold the head 213 against downward movement, and the pawl 227 to hold the head 219 against downward movement. The rods 195, 212 and 218 operate through fixed guide sleeves 228, as shown. A spring 229 is provided, which is adapted to turn the rock-shaft in one direction, to wit, in a direction to move the pawls into engagement with the heads. The pawls 225, 226 and 227 being all rigidly mounted upon a common rock-shaft 224, when either of the reciprocatory rods is moved to a position to expose the signal, the other signal which is being exposed will be automatically released as the conical head will engage the pawl and turn the rock-shaft. An electric bulb (not shown) or any other source of light may be disposed inwardly of the shell 202 or in the rear of the sections of glass, so that they may be readily seen at night.

In order that the operation of the system may be more clearly understood, it will be assumed that an engine or train is in block A, whereby the signal paddle 12$^a$ will assume the uppermost position, to indicate danger or stop, the paddle 12$^b$ its intermediate position to indicate caution, and the paddle 12$^c$ the lowermost position to indicate a clear block. The engine 54 is now traveling from the block D into or toward the block C, in the direction of the arrow. When the shoe 60 is brought into engagement with the outer permanently deënergized or ramp extension 8 of the ramp section 6, the mechanically operated and electrically controlled mechanism within the casing or shell 63 is slightly mechanically operated but not sufficiently to operate the throttle lever actuating means and the brake applying means. The shoe 60 now travels into engagement with the ramp section 6. As soon as this engagement is made, a circuit is closed to energize the electro-magnets 103' and 163. The armature lever 101 is at once drawn upwardly to move the bolt 95 out of the opening 93, whereby the sleeve 85 is free to turn in the sleeve 88. In this closed circuit current flows from one pole of the source of current 19, through armature 18, contact 20', contact 20, wire 22, segment 21, wire 41, electro-magnet 38, wire 39, contact 40, segment 31, contact 42, wire 43, ramp section 6, shoe 60, wire 62, electro-magnets 103' and 163 (one end of the magnet 163 being grounded to the frame work of the engine) the frame work of the engine, rail 1, and through wire 19' back to the opposite pole of the source of current. When the shoe 60 continues to travel longitudinally of and in engagement with the ramp section 6, the same is elevated, which causes a vertical movement of the rod 81, for a predetermined distance. The connecting means between the shoe 60 and the rod 81, including the pivoted slotted link 69 and associated elements, is adapted to automatically disconnect the shoe and rod 81, when the rod has been moved a predetermined distance. The rod 81 will now swing the crank 86 upwardly, which will turn the sleeve 85. The bolt 95 having been moved out of the opening 93, the turning of the sleeve 85 cannot now turn the sleeve 88 to effect a movement of the electro-magnet including the winding 103 and the crank 91. It is thus seen that the engine will not be stopped when the shoe 50 travels into engagement with the ramp section 6 at the entrance end of the block C. As above stated, when the circuit is closed, current passes through the electro-magnet 38 to energize the same. When this electro-magnet is energized, the holding pawl 37 will release the rock-shaft 27, whereby the gravity operated crank 32 will slowly turn the crank shaft in one direction to break the engagement between the contacts 31 and 42, to disconnect the ramp 6 from the source of current. As above stated, this ramp 6 is not disconnected from the source of current until the shoe 60 has at least traveled into engagement with the insulation 7, whereby current will be supplied to the electro-magnet 103′ and 163, during the travel of the shoe longitudinally of the ramp section 6. The function of disconnecting the ramp section 6 from the source of current after the shoe 60 has traveled longitudinally of the same for its entire length and received current therefrom during such travel, is to protect the rear of the engine when the same enters the next block, in case the relay should fail to open upon the entrance of the engine into such block, it being borne in mind that the function of this relay in opening is to disconnect the ramp section 6 from the source of current. When the shoe 60 travels into engagement with the insulation 7, the above referred to closed circuit is opened and a second circuit is closed when the shoe engages the ramp section 5. In this second closed circuit current flows from one pole of the source of current 19 through armature 18, contact 20′, contact 20, wire 22, segment 21, contact 24, wire 44, ramp section 5, wire 62, electro-magnets 103′ and 163, the frame work of the engine, rail 1, wire 19′, and back to the opposite pole of the source of current 19. The rod 81 gradually descends as the shoe 60 travels toward the outer end of the ramp section 5. Upon the upward movement of the rod 81, as above stated, the carriage 152 and associated elements are elevated. The electro-magnet 163, being energized, the armature 162 will swing the bell-crank lever 160 to the left, whereby the opening 190 will receive the danger signal operating rod or shaft 218 and the clear signal operating rod or shaft 212 will not pass within the opening 191 but will engage the plate 189 to be elevated thereby. The clear signal 210 will now be moved within the opening 211, the other signals being disposed in their concealed positions. The pawl 226 will engage beneath the conical element or head 213, for holding the signal 210 in its upper or visible position. When the carriage 52 and associated elements descend, which takes place when the shoe 60 is traveling in engagement with the ramp section 5, toward the outer end thereof, the bell-crank lever 160 will still be held adjacent the electro-magnet 163. The extension or tooth 192 will clear the extension 194 carried by the caution signal operating rod or shaft 195. The extension 192 moving in a vertical plane inwardly of the extension 194 will not now draw the caution signal operating rod or shaft 95 downwardly, thus allowing the clear signal 210 to remain in its uppermost or visible position. It is thus seen that the engine will be allowed to pass the ramp 4 at the entrance end of the block C without being stopped and at the same time a clear signal will be displayed in the cab to indicate that the block is clear.

As soon as the engine travels into the entrance end of the block C the normally closed track circuit will be made through the engine, thus cutting the electro-magnets 15 out of circuit. It is thus seen that the ramp sections 6 and 5 at the entrance end of the block C are both disconnected from the source of current 19, at the point 20′. The engine now travels toward the ramp sections 6 and 5 adjacent the entrance end of the block B. The signal paddle 12ᵇ being disposed in its intermediate position, the ramp section 6 will have electrical connection with the source of current 19 while the ramp section 5 will be disconnected therefrom at the point 25. When the shoe 60 engages the ramp section 6, a circuit is closed to energize the electro-magnets 103′ and 163. This circuit is the same as the one hereinabove traced in connection with the ramp section 6 at the entrance end of the block C and it is thought to be unnecessary to trace the same again. The electro-magnet 103′ being energized, the bolt 95 will be withdrawn from the opening 93, whereby the sleeve 85 cannot turn the sleeve 88. The electro-magnet 163 being energized, the bell-crank lever 160 will be swung inwardly adjacent the electro-magnet, whereby the danger signal operating rod or shaft 218 will pass through the opening 190 upon the upward movement of the carriage 152 and associated elements. The clear signal operating shaft or rod 212 being in its uppermost position cannot of course be further elevated. When the shoe 60 engages the insulation 7 the circuit is opened whereby the two electro-magnets 103′ and 163 are deënergized. When the shoe 60 engages the ramp section 5, said ramp section being disconnected from the source of current 19, as above stated, the electro-magnet 163 will remain deënergized as the carriage 152 and associated elements descend. The electro-magnet being deënergized, the arm or weight 165 included in the bell-crank lever 160 will swing the vertical arm of this bell-crank lever to the right or away from the electro-magnet to assume its intermediate position, the rod or shaft 218 engaging the inner end wall 10ˣ of the opening 190, (see Fig. 6) to prevent the bell-crank lever 160, from swinging to the outermost position. The intermediate position of the plate 189 is shown by dotted lines in Fig. 6. The extension 192 will now be disposed in the same vertical plane with the extension 194, to engage therewith and draw the caution signal operating rod or shaft 195 downwardly. When the rod or shaft 195 is drawn downwardly (see more particularly Fig. 11), the tapered head or element 204 will engage the pawl 225 to swing the same outwardly to allow the head to pass it, such pawl finally engaging above the head 204 to hold the shaft 195 against upward movement. This movement of the pawl 225 turns the rockshaft 224, whereby the pawl 226 will be moved from beneath the tapered element or head 213. The spring 208 will then force the plate 205 downwardly, whereby the clear signal 210 will be moved downwardly to its concealed position before or about the time that the caution signal 201 is moved to its lower or visible position. The extension 188, is also disposed in the same vertical plane with the extension 187 when the carriage 152 and associated elements are in the uppermost position. When the carriage descends, as above stated, the extension 188 will engage the extension 187, to swing the same downwardly. The lever 173 is of course swung downwardly, whereby the element 176 will move the rod 177 downwardly. As more clearly shown in Fig. 14, the downward movement of the rod 177 will unseat the valve 180, thus establishing communication between the pipes 118 and 185, whereby air or steam will be supplied to the whistle 186, to sound the same. It is thus seen that when the engine enters the block B, which is in the caution condition, two signals will be given to indicate this condition, to wit, an audible signal and a visual signal. When the engine enters the block B the track circuit will be made through the engine and the electro-magnet 15 cut out of circuit.

The signal paddle 12ª being disposed in its uppermost or danger position, the rockshaft 27 at the entrance end of the block A has been turned to rotate the roll 29 so that contact 40 has no engagement with the contact segment 31. The insulation block 25 now engages the stationary contact 23. It is thus seen that both ramp sections 6 and 5 are disconnected from the source of current 19. These ramp sections are further disconnected from the source of current 19, at the point 20', the electro-magnet 15 being cut out of circuit owing to the presence of an engine in the block A. When the engine 54 travels into proximity to the ramp section 6 at the entrance end of the block A, the shoe 60 will engage with the same and be properly elevated. There is no closed circuit to energize the electro-magnets. The upward movement of the rod 81 swings the crank 86 upwardly, to turn the inner sleeve 85, which will now effect a corresponding movement of the sleeve 88, as the bolt 95 extends into the opening 93 and serves to rigidly lock these parts together. The electro-magnet 103′ together with its shell 104 and associated elements and the crank 91 are swung in one direction. The movement of the electro-magnet causes the longitudinal movement of the pitman 125 which in turn swings the crank 124. This crank 124 turns the shaft 123, which shifts the valve 120 (see Fig. 15), to the position indicated by the dotted lines. It is thus seen that communication will be established between the pipes 117 and 121. Compressed air will now pass through pipe 115, coupling 116, pipe 117, valve shell 119, and pipe 121 into the cylinder 144. The piston 147 will be moved toward the forward end of the cylinder 144, to swing the throttle lever 128 inwardly for cutting off the supply of steam. The crank 91 which is simultaneously swung with the electro-magnet 103′, effects a longitudinal movement of the rack bar 109 (see Figs. 3 and 4), which rack bar will turn the pinion 113 for applying the brakes. It is thus seen when the shoe 60 engages the ramp section 6 at the entrance end of the block A, the steam will be cut off and the brakes applied. When the shoe 60 travels into engagement with the ramp section 6 at the entrance end of the block A, as above stated, the carriage 152 and associated elements are elevated. The electro-magnet 163 being deënergized, the arm 165 will swing the vertical arm of the bell-crank lever to the right, so that the bell-crank lever 160 will occupy its outermost position. When the bell-crank lever 160 is elevated, the horizontal plate 189 will engage the danger signal operating rod or shaft 118, to force the same upwardly, the clear signal operating rod or shaft 212, upon being released moving downwardly through the opening 191. When the horizontal plate 189 descends, the arm or weight 165 holds the vertical arm of the bell-crank lever 160 in its outermost position so that the extension 192 will be disposed in a vertical plane to the right or outwardly of the extension 194 and the extension 188 will be disposed in a vertical plane to the right or outwardly of the extension 187, whereby the caution signal means will not be operated and the danger signal will remain in its visible position. It is thus seen that when the shoe 60 travels into engagement with the ramp sections 6 and 5 at the entrance end of the block A, a visual danger signal will be shown in the cab. As more clearly shown in Fig. 5, the opening 93 is much larger than the opening 94. By reason of this construction when the inner sleeve 85 is turned in the direction of the arrow (the electro-magnet 103′ being deënergized) one wall of the opening 93 will engage the inner or lower end of the bolt or latch 95, whereby the outer sleeve 88 is turned in the same direction, for actuating the train stopping means. When the inner sleeve 85 is turned in a reverse direction (owing to the size of the opening 93 and the direction in which the same extends) such inner sleeve will not turn the outer sleeve, whereby the brakes will remain set and the throttle lever remain in its inner position for cutting off the steam, until manually actuated by the engineer.

When the engine passes into the entrance end of each block, the signal paddle at the entrance end of the block should be thrown to the danger position. In order that the engineer may know whether or not this has been done, I provide the auxiliary ramp 45 and associated elements. The contacts 30 and 48 are adapted to have electrical connection only when the semaphore paddle is moved to its uppermost or danger position. It is obvious that when the semaphore paddle has ben swung to its uppermost position and the engine moves into proximity to the ramp 45 so that the shoe 60 engages the ramp, a circuit will be closed for energizing the mechanically operated and electrically controlled mechanism, whereby the engine will pass the ramp without being stopped. In this circuit current will flow from one pole of the source of current 50 through wire 49, contact 48, contact segment 30, contact 47, wire 46, ramp 45, shoe 60, wire 62, the electro-magnets, the frame work of the engine, rail 1 and back to the opposite pole of the source of current 50. If the ramp 45 has no electrical connection with the source of current the mechanically operated electrically controlled mechanism will stop the engine.

It is to be understood that the form of my invention herewith shown and described, is to be taken as a preferred example of the same, and that various changes in the shape, size and arrangement of parts may be resorted to without departing from the spirit of the invention or the scope of the subjoined claims.

Having thus fully described my invention, I claim:

1. In a train stopping system of the character described, a plurality of substantially horizontally arranged pivoted sleeves one of which extends into the other, said sleeves being provided with lateral openings; a movable bolt adapted to enter the lateral openings to lock the sleeves for rotation together in one direction; electrically operated means to move the bolt for unlocking the sleeves; mechanically operated means to turn one sleeve; a valve for actuating train control means; and connecting means between the valve and one sleeve.

2. In a train control system of the character described, a pivoted sleeve having a lateral opening; a second pivoted sleeve arranged upon the first named sleeve and having a lateral opening adapted to register with the first named lateral opening; an upstanding crank connected with the second named pivoted sleeve; an electro-magnet carried by the upstanding crank; a gravity operated bolt adapted to move downwardly into the lateral openings to lock the sleeves for movement together in one direction and to move upwardly when the magnet is energized; train control means; connecting means between the upstanding crank and the train control means; mechanically operated means to turn the first named sleeve; and means to energize the magnet under certain track conditions.

3. In a train control system of the character described, a pair of substantially horizontal sleeves one of which extends into the other; electrically operated means carried by one sleeve to be bodily moved thereby and adapted when deënergized to lock the sleeves for movement together in one direction and when energized to unlock the sleeves; train control means actuated by the turning movement of one sleeve; and mechanically operated means to move the other sleeve.

4. In a train control system of the character described, a supporting structure, a crank carrying a laterally extending sleeve at one end thereof, a swinging support including a sleeve surrounding the first named sleeve, an electro-magnet carried by the swinging support, a latch adapted to lock and unlock the sleeves, an armature connected with the latch and disposed adjacent the electro-magnet, train stopping means connected with the swinging support to be operated thereby, mechanically operated means to move the crank, and electrical means to close a circuit including the electro-magnet.

5. In a train control system of the character described, a supporting structure, a pivoted crank mounted thereon and provided near one end with a lateral extension, a swinging support including a sleeve surrounding the lateral extension and provided with an opening adapted for registration with an opening in the lateral extension, an electro-magnet mounted upon the swinging support, an armature lever pivotally connected near one end with the swinging support and disposed below and adjacent the electro-magnet, a bolt carried by said armature lever to operate within the openings formed through the sleeve and lateral extension, mechanically operated means to move the crank, electrical means to close a circuit including the electro-magnet, and train stopping means operated by and upon the movement of the swinging support.

6. In a train control system of the character described, a horizontally arranged supporting shaft, a sleeve pivotally mounted upon the supporting shaft and provided with a laterally extending crank and having a laterally extending opening formed through the same, train stopping means, connecting means between the crank and train stopping means, a second sleeve having a portion thereof extending into the first sleeve and provided with a laterally extending opening adapted for registration with the first named laterally extending opening, a bolt movably mounted within the laterally extending openings to lock and unlock the sleeves, electrically operated means to move the bolt, a second crank connected with the second sleeve, a reciprocatory shoe carrying member connected with the second crank, a ramp disposed in the path of travel of the shoe to mechanically move the reciprocatory member, a source of current, and means connecting and disconnecting the ramp with and from the source of current.

7. In a train control system of the character described, a plurality of horizontally arranged pivoted sleeves one of which extends into the opening of the other, said sleeves having lateral openings, an approximately vertically movable bolt adapted to move downwardly by gravity to enter the lateral openings and lock the sleeves together, an electrically operated device to move the bolt upwardly, train stopping means operated upon the turning movement of one sleeve, and mechanically operated means connected with the other sleeve to turn the same.

8. In a train control system of the character described, a suitably supported shaft, a crank provided at one end with a laterally extending sleeve having an opening formed through its periphery, a support including a sleeve to receive the first named sleeve and having an opening formed through its periphery to be moved into registration with the first named opening, an armature lever connected with the support, a bolt carried by the armature lever to operate within the openings, an electromagnet mounted upon the support above the armature lever, train stopping means connected with the support to be operated upon the movement thereof, mechanically operated means to move the crank, and electrical means for closing a circuit including the electro-magnet.

9. In a train control system of the character described, a supporting structure, a pivoted sleeve mounted thereon, mechanically operated means to turn the sleeve, a swinging support including a sleeve pivotally mounted upon the first named sleeve and carrying a crank, an electro-magnet connected with the support to move therewith, means to lock said sleeves together, means operated by the electro-magnet to operate the locking means, means connected with the movable support and operated upon the movement thereof to cut off the supply of steam, means connected with the crank and operated upon the movement thereof for applying the brakes, and means for closing a circuit including the electro-magnet.

10. In apparatus of the character described, a plurality of signal operating rods, a member movable toward and away from the rods, means to move the member toward and away from the rods, and means to laterally shift the member with relation to the rods.

11. In a train control system of the character described, a reciprocatory structure, train stopping means, connecting means between the train stopping means and the reciprocatory structure adapted to become inoperative and operative, electrical means adapted when energized to render the connecting means inoperative, a plurality of signal apparatuses, an operating device having connection with said reciprocatory structure and adapted to operate a selected signal apparatus when occupying a certain position upon the movement of the reciprocatory structure, electrical means adapted to shift the operating device to a desired position, a ramp to mechanically operate the reciprocatory structure, and a circuit including a source of current connected with the ramp to supply current to the first and second named electrical means.

12. In a train control system of the character described, a plurality of signal operating rods, an apertured arm arranged near the ends of the signal operating rods, means to shift the apertured arm laterally with relation to the rods and means to move the apertured arm longitudinally of the rods.

13. In a train control system of the character described, a movable carriage, mechanically operated means to move the same, an operating device connected with the carriage for movement therewith and adapted to be moved with relation thereto, a plurality of signal apparatuses to be operated by the operating device depending upon the relative position that the same occupies when the carriage is moved, and electrical means to effect the relative movement of the operating device.

14. In a train control system of the character described, a substantially vertically movable carriage, mechanically operated means to move the same, an operating device connected with the carriage for movement therewith and adapted to be moved with relation thereto and including a perforated arm, a plurality of signal apparatuses, operating rods connected therewith and disposed above and near the perforated arm, and electrical means adapted when energized to effect the relative movement of the carriage so that the perforated arm will move a selected one of the operating rods.

15. In a train control system of the character described, a substantially vertically reciprocatory carriage, mechanically operated means to move the reciprocatory carriage, an operating device pivotally connected with the carriage and including a perforated arm, a plurality of signal apparatuses, operating rods connected with certain of the signal apparatuses and disposed near and above the perforated arm, an operating rod connected with one of the signal apparatuses and having a portion thereof disposed below a portion of the perforated arm when the latter is in the raised position to be engaged thereby upon the downward movement of the perforated arm, and electrical means adapted when energized to swing the pivoted operating device in one direction.

16. In a train control system of the character described, a reciprocatory carriage, mechanically operated means to move the same, an operating device pivotally connected with the carriage and including an arm provided with openings disposed in different vertical planes, operating rods disposed near the arm, signal apparatuses actuated by the operating rods, and electrical means adapted when energized to swing the pivoted operating device in one direction.

17. In a train control system of the character described, a reciprocatory carriage, mechanically operated means to move the same, an operating device pivotally connected with the carriage and including an arm provided with openings disposed in different vertical planes, a plurality of signal apparatuses, operating rods connected with certain of the signal apparatuses and disposed near and above the arm, an operating rod connected with one of the signal apparatuses and having a portion thereof disposed below a portion of the arm when the latter is in the raised position, and electrical means adapted when energized to swing the pivoted operating device in one direction.

18. In a train control system of the character described, a plurality of signal operating rods adapted to be moved in opposite directions with relation to each other, a member adapted to move the rods in opposite directions, means to move the member laterally with relation to the rods, and means to move the member longitudinally of the rods.

19. In a train control system of the character described, a plurality of signal operating rods adapted to be moved in opposite directions with relation to each other, a member adapted to move the rods in opposite directions and movable toward and away from them, means to laterally shift the member with relation to the rods, and means to move the member toward and away from the rods.

20. In a train control system of the character described, a plurality of movable signal elements; reciprocatory rods to move the signal elements to the active positions; latch means to detachably hold each signal element in the active position and to automatically release it when the other signal element is moved to the active position; means to move each rod to the active position; and automatic means to return the rod to the normal position, when released.

21. In a train control system of the character described, a plurality of movable signal elements; movable rods connected with the signal elements and provided with combined cam and latch heads; a rock-shaft; a spring to turn the rock-shaft in one direction; pawls carried by the rock-shaft and adapted to contact with the combined cam and latch heads; springs to move the rods in one direction; and means to move the rods in an opposite direction in opposition to the springs.

22. In a train control system of the character described, a plurality of movable signal elements; a common member to move the elements to the active position; means to hold each element in the active position when moved thereto while the other element is in the inactive position; and means to operate the holding means to release the signal element in the active position when the other signaling element is moved to the active position.

23. In a train control system of the character described, inner and outer sleeves, the outer sleeve being provided with a small laterally extending opening and the inner sleeve being provided with a relatively long opening disposed adjacent the first named opening, a bolt adapted to operate within said openings, electrically operated means to move the bolt, and means to turn the inner sleeve.

In testimony whereof I affix my signature in presence of two witnesses.

WILLIAM B. MURRAY.

Witnesses:
JAMES L. CRAWFORD,
B. P. FISHBURNE.